J. S. BENSON.
VULCANIZER.
APPLICATION FILED NOV. 19, 1912.
1,099,112.
Patented June 2, 1914.
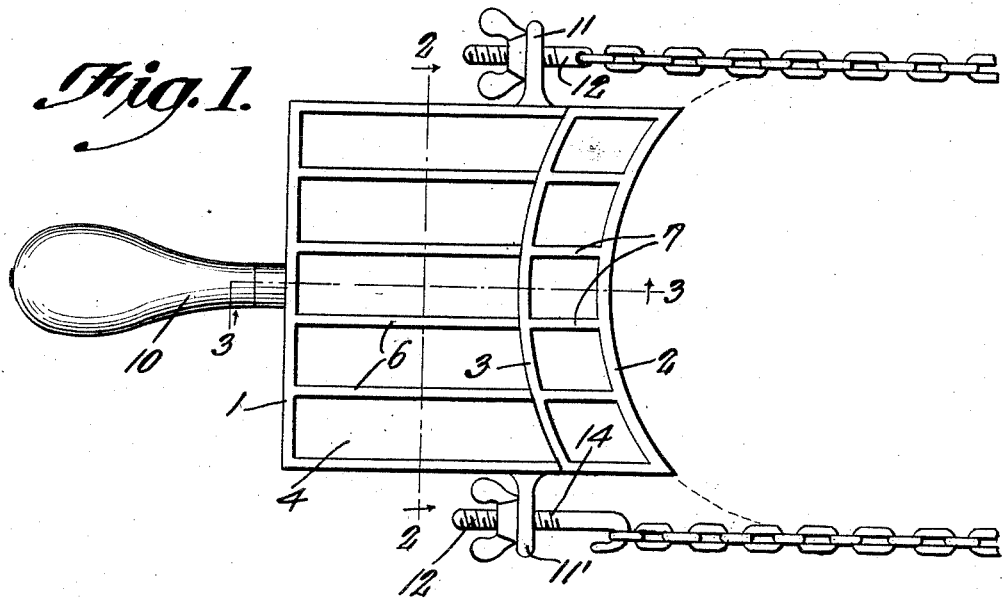
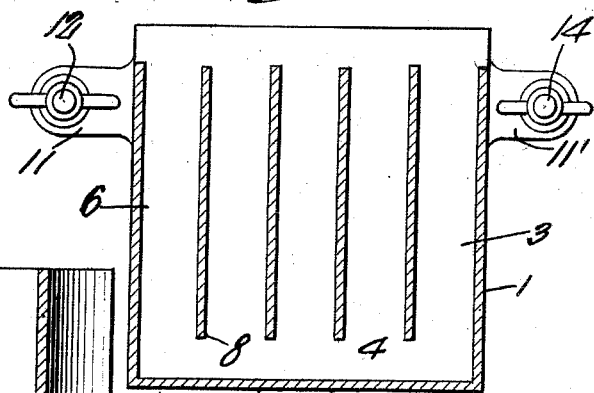
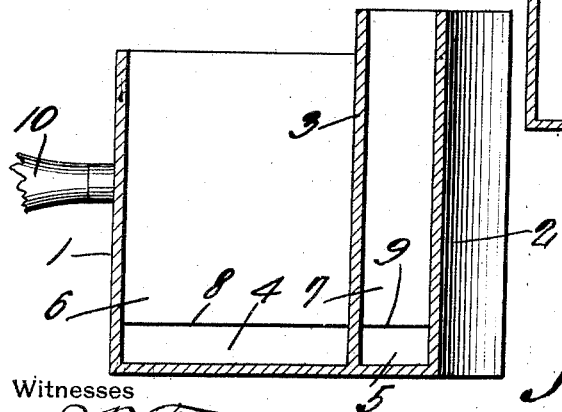
Witnesses
J. S. Benson, Inventor
by C. A. Snow & Co.
Attorneys

UNITED STATES PATENT OFFICE.

JOSEPH SCOTT BENSON, OF RIVERSIDE, IOWA, ASSIGNOR TO POSITIVE SUPPLY COMPANY, OF DAVENPORT, IOWA.

VULCANIZER.

1,099,112.

Specification of Letters Patent.

Patented June 2, 1914.

Application filed November 19, 1912. Serial No. 732,384.

*To all whom it may concern:*

Be it known that I, JOSEPH S. BENSON, a citizen of the United States, residing at Riverside, in the county of Washington and State of Iowa, have invented a new and useful Vulcanizer, of which the following is a specification.

The present invention relates to improvements in portable vulcanizers, the primary object of the present invention being the provision of a vulcanizer adapted to be connected to vulcanize a tire without removing the tire from the rim or wheel, the same having means for containing a liquid fuel and also a compartment for containing water interposed between the fuel and the tire, whereby the water is heated and acts as a means to prevent the burning of the tire or the direct contact therewith of an excessive temperature as would be the case if the fuel heated metal were placed directly in engagement with the tire.

A further object of the present invention is the provision of a portable vulcanizer divided into a water and a fluid hydrocarbon containing compartment, both of which compartments are provided with a plurality of metal ridges or partitions that tend to conduct the heat evenly throughout the body of water and the surface engaging the tire, thus insuring an even distribution of the heat and the consequent desired action upon the tire.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—Figure 1 is a top plan view of the complete vulcanizer in the position it assumes when vulcanizing a tire. Fig. 2 is a section taken on the line 2—2 of Fig. 1. Fig. 3 is a section taken on line 3—3 of Fig. 1.

Referring to the drawings, the numeral 1 designates the container of the vulcanizer, which is provided with the tire engaging curved wall 2 and with the intermediate partition 3 which is disposed within and parallel to the curved wall 2 and divides the vulcanizer chamber or casing into two compartments 4 and 5 respectively. The compartment 4 is for containing a liquid fuel, such as gasolene, while the compartment 5 is for containing water.

Disposed longitudinally of both chambers of the device, are the two series of metal partitions 6 and 7, both of which series terminate at the respective points 8 and 9 above the bottoms of the respective chambers 4 and 5 so as to permit of a free circulation of the respective liquids within the chambers or compartments of the vulcanizer.

Formed integral with the casing 1 upon opposite sides thereof, are the two apertured lugs 11—11', one of which has attached thereto, the adjusting screw 12 to which is connected one end of the chain 13, the other end of the chain 13 being passed about the rim of a tire (not shown) and connected to the adjusting bolts 14 carried by the apertured lug 11'. By this means the vulcanizing device is properly attached to the wheel, the curved surface 2 and adjacent portion of the tire to be vulcanized.

From the foregoing description, taken in connection with the drawings it is evident that the operation of the device is readily understood, but briefly stated it is as follows: The compartment 5 is filled with water to the desired height, while the compartment 4 has sufficient gasolene placed therein to, when ignited, warm the grids, so that such heat may be transmitted through the grids 7 to heat the water within the chamber 5, there thus being disposed between the burning gasolene within the chamber 4 and the tire, a wall of water within the chamber 5, to distribute an even temperature for vulcanizing upon the curved face 2 and consequently upon the portion of the tire to be vulcanized.

The handle 10 is connected to the casing for gripping, so that the casing may be readily placed in position and held before the clamps 12 and 14 are operated.

What is claimed is:

1. A portable vulcanizer, including a tire engaging member in the form of an open ended receptacle, a transverse partition disposed therein and dividing the same into two compartments, one of said compartments being of lesser area and for containing water while the other compartment is a fuel container, and a plurality of spaced partitions disposed longitudinally of and within the respective compartments, said longitudinal partitions being in heat conducting relation to the transverse partition and the tire engaging surface of the member.

2. A portable vulcanizer, including a tire engaging member having a face curved to conform to the contour of the tire, a curved partition disposed in parallel with the curved tire engaging face of the member and dividing the member into two compartments, one of the compartments adjacent the curved wall being of lesser area than the other compartment, and a plurality of spaced partitions disposed longitudinally of and within the respective compartments and having their lower edges terminate at a point above the bottoms of the compartments, said longitudinal partitions being in heat conducting relation to the curved partition and the tire contacting portion of the member.

3. A portable vulcanizer, including a cast metal body, having one end curved transversely and projected at a greater height than the side walls and the opposite end walls thereof, a curved partition disposed in spaced relation to and parallel with the tire engaging wall, the same dividing the member into two compartments, the compartment between the two curved walls constituting a water compartment, and, of greater height than the other compartment, a plurality of spaced longitudinally disposed partitions formed in parallel to the side walls of the member and in engagement with the end walls and curved partition, the lower edges of the same terminating in a plane above the bottom of the member, a pair of oppositely disposed apertured lugs carried by the side walls of the member for forming a supporting means for the same in tire engaging position, and a handle carried by the end wall of the member for supporting the same during the placing of the member in position.

4. A portable vulcanizer comprising a substantially box like receptacle having its top open to the atmosphere and divided interiorly by a transverse partition into two compartments, one of which is adapted to contain water and the other a combustible fluid; the outer vertical side of said receptacle that constitutes the wall of the water compartment being suitably shaped to form a vulcanizing-plate.

5. A portable vulcanizer comprising a substantially box-like receptacle having its top removed and divided interiorly by a transverse partition into two compartments, one of which is adapted to contain water and the other combustible fluid, said water compartment being divided into a series of vertically disposed chambers that communicate at their lower ends, the outer vertical side of said receptacle constituting the wall of the water compartment being suitably shaped to form a vulcanizing-plate.

6. A portable vulcanizer comprising a substantially box-like receptacle having its top removed and divided interiorly by a transverse partition into two compartments, one of which is adapted to contain water and the other combustible fluid, said combustible fluid compartment being divided into a series of vertically disposed flues by partitions extending at right angles to the partition separating said water and fluid compartments, said water compartment being suitably shaped to form a vulcanizing plate.

7. A portable vulcanizer comprising a substantially box-like receptacle having its top removed and divided interiorly by a transverse partition into two compartments one of which is adapted to contain water and the other combustible fluid, and said compartments divided transversely into two series of vertically disposed chambers the bottoms of the chambers in each compartment communicating with each other, and the outer vertical side of said receptacle constituting the wall of the water compartment being suitably shaped to form a vulcanizing plate.

8. A portable vulcanizer comprising a suitable box-like receptacle the top of which is normally open to the atmosphere and one of the vertical walls of which constitutes a vulcanizing surface, a water chamber so arranged that the fluid within the same is in contact with said vulcanizing surface, a heat-generating chamber arranged adjacent said fluid chamber, and vertically disposed transverse walls dividing said water-chamber and said heat-generating chamber into several compartments.

9. A portable vulcanizer comprising a substantially box-like receptacle having its top removed and divided interiorly by a transverse partition into two compartments, one of which is adapted to contain water and the other combustible fluid, said combustible fluid compartment being divided into a series of vertically disposed flues by partitions extending at right angles to the partition separating said water and fluid compartments, and said water compartment being divided into a corresponding series of vertically disposed chambers, said water compartment being suitably shaped to form a vulcanizing plate.

In testimony that I claim the foregoing as my own, I have hereto affixed my signature in the presence of two witnesses.

JOS. SCOTT BENSON.

Witnesses:
 FRANK CRITZ,
 JACOB B. CRITZ.

---

Copies of this patent may be obtained for five cents each, by addressing the "Commissioner of Patents, Washington, D. C."